(12) United States Patent
Walker et al.

(10) Patent No.: US 9,026,545 B1
(45) Date of Patent: May 5, 2015

(54) TARGETING ADVERTISEMENTS BASED ON CACHED CONTENTS

(75) Inventors: Troy Walker, Los Angeles, CA (US); Kevan Newton, Los Angeles, CA (US); Nicolas Hamatake, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 853 days.

(21) Appl. No.: 13/162,330

(22) Filed: Jun. 16, 2011

Related U.S. Application Data

(63) Continuation of application No. 12/110,455, filed on Apr. 28, 2008, now Pat. No. 7,987,194.

(60) Provisional application No. 60/985,099, filed on Nov. 2, 2007.

(51) Int. Cl.
*G06F 17/30* (2006.01)
*G06Q 30/02* (2012.01)

(52) U.S. Cl.
CPC ...... *G06F 17/30864* (2013.01); *G06Q 30/0251* (2013.01); *G06F 17/30528* (2013.01); *G06F 17/30672* (2013.01)

(58) Field of Classification Search
CPC .................. G06F 17/30528; G06F 17/30672; G06F 17/30731; G06F 17/30864; G06Q 30/0251

USPC ......... 707/709, 737, 740, 741, 748, 758, 771; 705/14.49, 51; 711/104, 118
See application file for complete search history.

(56) References Cited

U.S. PATENT DOCUMENTS

| | | |
|---|---|---|
| 7,596,609 B1 | 9/2009 | Refuah et al. |
| 7,987,194 B1 | 7/2011 | Walker et al. |
| 2006/0287920 A1 | 12/2006 | Perkins et al. |
| 2007/0208828 A1 | 9/2007 | Brier et al. |
| 2008/0235383 A1 | 9/2008 | Schneider |
| 2008/0281821 A1 | 11/2008 | Chen et al. |
| 2009/0144288 A1 | 6/2009 | Refuah et al. |
| 2009/0171914 A1 | 7/2009 | Montgomery et al. |

OTHER PUBLICATIONS

Office Action from U.S. Appl. No. 12/110,455, dated Aug. 5, 2010, 10 pages.
Reply to Office Action from U.S. Appl. No. 12/110,455, filed Jan. 5, 2011, 10 pages.

*Primary Examiner* — Shahid Alam
(74) *Attorney, Agent, or Firm* — Fish & Richardson P.C.

(57) ABSTRACT

A request including a domain name is received. Content associated with the domain name is identified in a cache. A language preference is determined based on the identified content. A content item is selected based on the identified content and the determined language preference. The selected content item is relevant to the identified content.

24 Claims, 8 Drawing Sheets

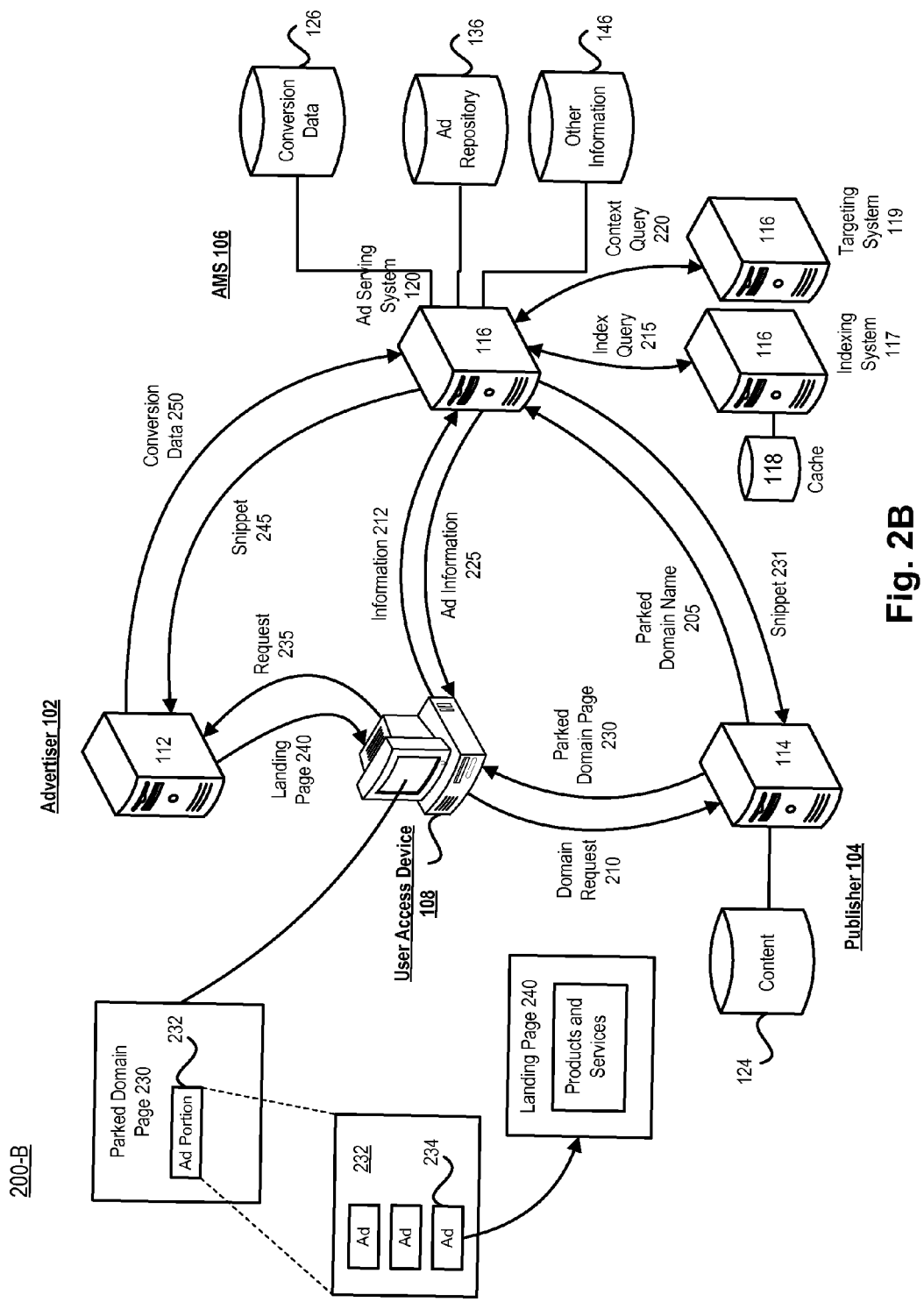

TARGETING ADVERTISEMENTS BASED ON CACHED CONTENTS

CLAIM OF PRIORITY

This application is a continuation of and claims priority under 35 U.S.C. §120 to U.S. patent application Ser. No. 12/110,455, filed Apr. 28, 2008 now U.S. Pat. No. 7,987,194, which in turn claims priority under 35 U.S.C. §119(e) to U.S. Provisional Patent Application Ser. No. 60/985,099 filed Nov. 2, 2007, the entire contents of each of which are incorporated herein by reference.

BACKGROUND

Advertising through interactive media is gaining popularity, with the Internet in particular becoming a dominant advertising medium. Internet users often search the Internet for products and services, and advertisers frequently use the Internet to target audiences interested in available products and services.

Interactive media advertising can involve distributing advertisements ("ads") to online publishers (e.g., an online newspaper) for display with publisher content. For example, ads for an automobile manufacturer can be displayed with publisher content (e.g., a publisher's web page), in order to drive online customers to the manufacturer website. Interactive media advertising can also involve distributing ads based on identifiers, rather than content. For example, ads can be displayed based on a domain name when an online user navigates to a specific URL (uniform resource locator).

When displaying ads based on a parked domain name, the domain name itself is often the only indicator available for determining the user's information need. When domain name registrants use generic top-level-identifiers (TLDs) (such as "com") rather than country-specific TLDs (such as "es"), determining a user's information need from the domain name can be especially difficult.

SUMMARY

In one implementation, a computer-implemented method comprises the actions of receiving a request including a domain name, identifying content associated with the domain name, determining a language preference based on the identified content, and selecting a content item based on the identified content and the determined language preference.

In another implementation, a computer-implemented method comprises the actions of storing content associated with domain names, receiving, at a first time, a request for content previously associated with a first domain name at a second time prior to the first time, and identifying information associated with the previous content to a network, the information used to determine a language preference associated with the first domain name.

In another implementation, a system comprises means for receiving a request including a domain name, means for identifying content associated with the domain name, means for determining a language preference based on the identified content, and means for selecting advertisements based on the identified content and the determined language preference.

In another implementation, a computer readable medium storing a computer program product includes instructions that, when executed, cause at least one processor to receive a request including a domain name, identify content associated with the domain name, determine a language preference based on the identified content, and select a content item based on the identified content and the determined language preference.

In another implementation, a system comprises an advertisement management system, the advertisement management system including at least one processor configured to receive a request including a domain name, identify content associated with the domain name, determine a language preference based on the identified content, and select a content item based on the identified content and the determined language preference.

BRIEF DESCRIPTION OF THE DRAWINGS

The accompanying drawings show features of implementations consistent with this disclosure and, together with the corresponding description, help explain principles and techniques associated with the disclosure.

FIGS. 2A and 2B are diagrams illustrating example data flows within an advertising environment.

DESCRIPTION

Figure 1:
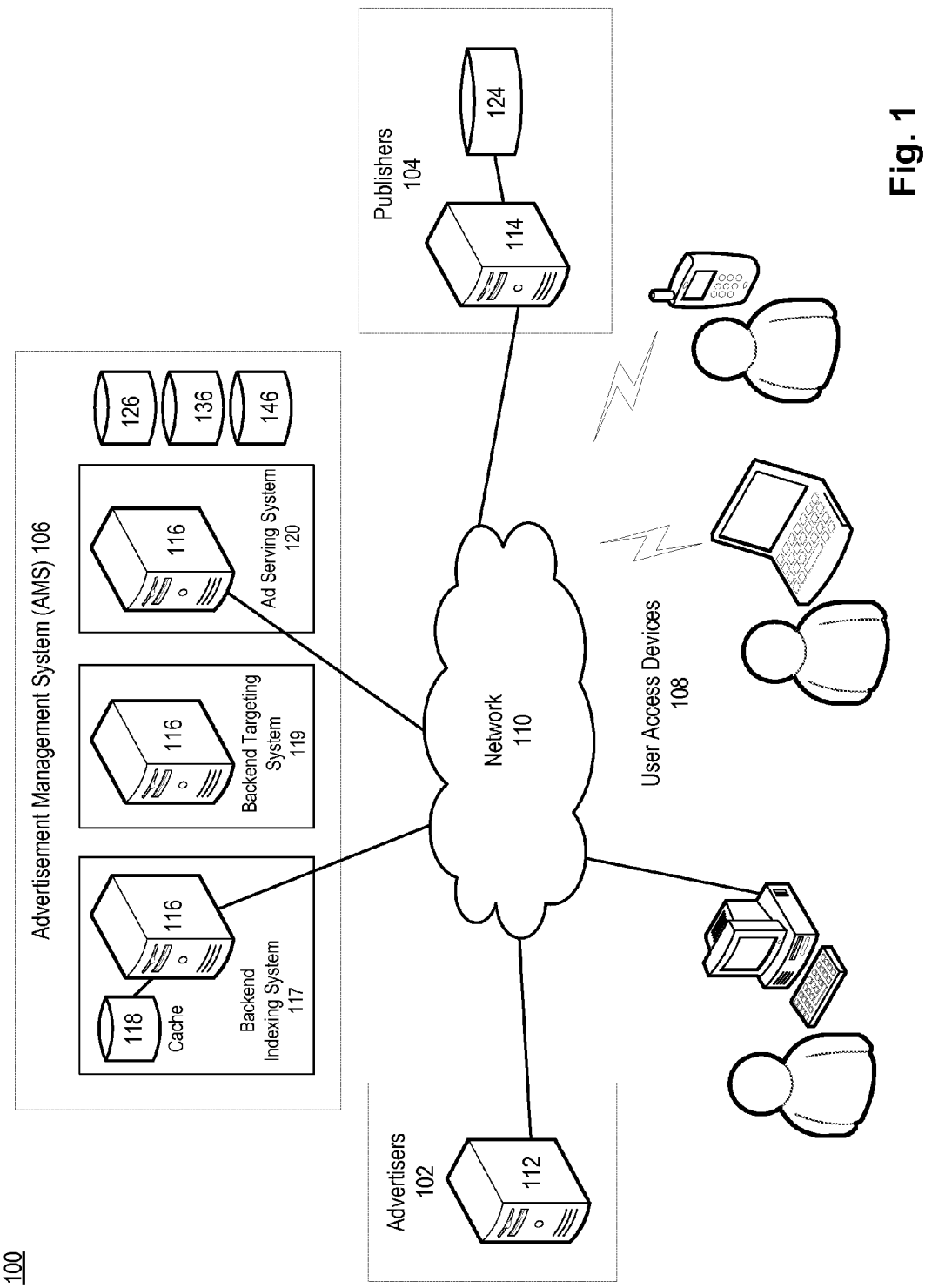
FIG. 1 is a block diagram depicting an example advertising environment.

The following description refers to the accompanying drawings, in which, in the absence of a contrary representation, the same numbers in different drawings represent similar elements.

In some implementations, ads can be targeted to parked domains. A "domain" can refer, for example, to any network host, resource or location (e.g., a web page). A "parked" domain refers, for example, to a domain with little or no developed content. Parked domain names can be associated with, for example, under-developed domains not yet ready for deployment or expired domains that were formerly associated with websites or other resources. Registrants and holders of such domains may wish to have ads targeted to these domains. Ads can be targeted to parked domains from an advertising network or other system. To "park" a domain can refer, for example, to a domain registrant or holder designating that ads should be targeted to the domain.

A "parked domain name" refers, for example, to an identifier (e.g., "example-name.com") that is associated with a parked domain and that resolves to a presentation of ads. In some examples, a parked domain name can be part of a URL (e.g., http://www.example-name.net). Domain names can include top-level domains (TLDs). The TLD refers to the portion of the domain name that follows the final "dot" of the domain name. TLDs can include, for example, generic TLDs (e.g., asia, biz, com, edu, gov, info, mil, net, org, etc.), country-specific TLDs (e.g., au, br, cn, de, es, eu, it, jp, us, etc.), and infrastructure TLDs (e.g., root).

Parked domains and domain names are not limited to Internet-based resources. In some examples, parked domains and domain names can include or be associated with radio networks, television networks, print media, and other media.

Furthermore, aspects of this disclosure are not limited to parked domains. In some examples, ads can be targeted to domains having fully developed content. Ads can be targeted to these types of domains based on the domain itself (e.g., the domain name) instead of the domain content or based on the domain in combination with the domain content.

In some implementations, an advertising distribution network can target to parked domains ads that are contextually relevant to the parked domains. For example, a particular parked domain may be associated with an expired webpage that previously contained Chinese content. To provide contextually relevant ads, Chinese ads may be targeted to this parked domain. The Chinese ads can include, for example, ads associated with Chinese advertisers and/or ads that are associated with non-Chinese advertisers but that are presented in the Chinese language.

To target contextually relevant ads to parked domains, a cache (e.g., a web cache) can be used. As an example, a user may navigate to a particular URL that is associated with an expired domain. A web cache can be searched for content previously associated with the domain in the URL. A language preference can be identified based on the identified past content. Contextually relevant ads can then be determined based on the language preference. For example, if the previous content is in the Chinese language, then Chinese ads can be selected for distribution to the parked domain. The selected Chinese ads can be presented to the user when the parked domain name is resolved. For example, the relevant ads can be sent from an ad serving system to the parked domain holder for rendering. The relevant ads can additionally or alternatively be sent from the ad serving system directly to a user device.

In some implementations, one or more systems and/or ad targeting processes can identify domains for which cached content should be considered when targeting ads. This can involve, for example, determining whether a particular domain might be better targeted if cached content were considered. Determining whether a domain might be better targeted can involve comparing the performance of ad targeting to the domain based on cached content with the performance of ad targeting to that domain based on other criteria and techniques. Various statistical and/or learning processes can be used to compare ad targeting performance.

In some implementations, detection of a parked domain name can trigger the use of cached content. When a new parked domain enters the advertising network or is otherwise detected, a web cache can be searched for previous content on that domain. If content is found, a language preference can be determined using various statistical language processes. The determined language preference can then be saved as a candidate language for targeting on the parked domain.

In some implementations, the use of the cache to determine relevant ads can be evaluated to skew future targeting. For example, using machine learning or other techniques, the performance of ad targeting with cached content can be compared with the performance of ad targeting without cached content. The results of this comparison can be used to skew future ad targeting. In some examples, processes can intelligently determine when to use previous content and how to use such content for ad targeting.

With reference to FIG. 1, an example advertising environment 100 may include one or more advertisers 102, one or more publishers 104, an advertisement management system (AMS) 106, and one or more user access devices 108, which may be coupled to a network 110. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content.

The advertisers 102 may include any entities that are associated with ads. An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored content. A content item can include an ad, as well as audio files, video files, and text files.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable to a user. In some examples, an ad impression may occur when an ad is displayed on a display device of a user access device. An ad group refers, for example, to an entity that represents a group of creatives that share a common characteristic, such as having the same ad targeting criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain and/or track ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. The term "content" refers to various types of web-based and/or otherwise presented information, such as articles, discussion threads, reports, analyses, financial statements, music, video, graphics, search results, web pages, web page listings, information feeds (e.g., RSS feeds), television broadcasts, radio broadcasts, printed publications, etc.

The publishers 104 can include registrants or holders of domains, which may include or be associated with publisher content. In some implementations, the publishers 104 may include registrants or holders of "parked" domains to which the AMS 106 targets ads. The publishers 104 may "park" domains, for example, when such domains expire or are under construction. A parked domain may be associated with a parked domain name, which resolves to a presentation of ads. A parked domain name can be part of a URL.

In some implementations, the publishers 104 may include entities with an Internet presence, such as online publication and news providers (e.g., online newspapers, online magazines, television websites, etc.), online service providers (e.g., financial service providers, health service providers, etc,), and the like. The publishers 104 can include television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present information (e.g., domain pages and content) to the requesting devices. The publishers 104 may generate and/or maintain such information and/or retrieve the information from other network resources. The publishers may provide or present information via various mediums and in various forms, including web based and non-web based mediums and forms.

The publishers 104 may be configured to provide to users ads that are relevant to content associated with the publishers 104. As discussed further below, these relevant ads may be provided from the AMS 106 for display to users. The AMS 106 can provide ads to the publisher 104 so that the publishers 104 can immediately render the ads (e.g., on a domain page) for users.

In some examples, the publishers 104 may retrieve a web page or other content for display on a particular user access device 108 and then forward the web page to the user access device 108 along with code that causes one or more ads from the AMS 106 to be displayed to the user. In other examples, the publishers 104 may retrieve one or more relevant ads (e.g., from the AMS 106), and then integrate the ads and the web page or other content for display to users.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or targeting of ads through the environment 100 to the user access devices 108. In some configurations, the AMS 106 can include or access functionality associated with the AdSense™ and the AdSense™ for Domains systems provided by Google, Inc. (Mountain View, Calif.). The AMS 106 can also include or access functionality associated with the AdWords™ systems provided by Google, Inc.

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems (e.g., 117 and 119). The ad serving system 120 may include one or more data processing systems 116 and may perform functionality associated with receiving requests, processing requests (e.g., semantic analyses), and delivering ads to publishers or user access devices. The backend processing systems may perform functionality associated with identifying relevant ads, processing various rules, performing clustering, filtering and validation processes, generating reports, maintaining accounts and usage information, and other backend system processing. The AMS 106 can use the backend processing systems and the ad serving system 120 to target ads from the advertisers 102 through the publishers 104 to the user access devices 108.

The AMS 106 may include or access one or more crawling, indexing and searching modules. These modules may browse accessible resources (e.g., the World Wide Web, publisher content, data feeds, etc.) to identify, index and store information. Searching modules may search information from various resources, such as the World Wide Web, publisher content, intranets, newsgroups, databases, and/or directories. In some implementations, the search modules may build one or more search indices. The search indices may be used to facilitate rapid retrieval of information relevant to a search query.

The AMS 106 may include one or more interface or front-end modules for providing the various features to advertisers, publishers, and user access devices. For example, the AMS 106 may provide one or more publisher front-end interfaces for allowing publishers to interact with the AMS 106. The AMS 106 may also provide one or more advertiser front-end interfaces for allowing advertisers to interact with the AMS 106. In some examples, the front-end interfaces may be configured as web applications that provide users with network access to features available in the AMS 106.

The AMS 106 provides various advertising management features to the advertisers 102. In some examples, the AMS 106 may include features for advertisers similar to those in the AdWords™ system provided by Google, Inc. The AMS 106 advertising features may allow users to set up user accounts, set account preferences, create ads, select keywords for ads, create campaigns or initiatives for multiple products or businesses, view reports associated with accounts, analyze costs and return on investment, target customers in different regions, target ads to particular publishers, track financial information, track ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. For example, an advertisement related to a cleaning product may be targeted to content relating to removing stains. In some implementations, the keywords can be written in a foreign language including non-Roman character sets (e.g., Japanese, Chinese, etc.).

The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. In some examples, the AMS 106 may include features for publishers similar to those in the AdSense™ for Domains system provided by Google, Inc. The AMS 106 may allow the publishers 104 to "park" domains to the AMS 106. The AMS 106 may allow publishers that park domains to redirect traffic from parked domains to the AMS 106. The AMS 106 may then provide contextually relevant ads for display to users. The AMS 106 can deliver these ads to the publishers 104 or directly to the user access devices 108.

The AMS 106 may crawl content provided by the publishers 104 and deliver ads that are relevant to publisher sites, site content and publisher audiences based on the crawled content. In some examples, the AMS 106 may deliver relevant ads based on an identifier (e.g., a parked domain name) associated with requested publisher information (e.g., a parked domain page). The AMS 106 may also target ads based on user information and behavior, such as particular search queries performed on a search engine website, a geographical location of the user, etc. The AMS 106 may store user-related information (e.g., personal profiles of users, geographic locations of users, ad context information) in a general data repository 146. In some examples, the AMS 106 can add search services (e.g., a Google™ search box) to a publisher site and deliver ads targeted to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to identify relevant ads for targeting using various information, such as ad keywords, content keywords, geographic information, web page identifiers and/or content indices. As an example, the AMS 106 can receive a URL of a requested domain page (e.g., from the user access device 108 or the publisher 104). The AMS 106 may match the domain name in the URL to indexed content keywords associated with the URL to determine a user interest. The AMS 106 may then match the user interest with ads in the repository 126 relevant to the interest. The AMS 106 may, for example, use ad keywords from the advertisers 102 and/or other ad information to identify the ads. The AMS 106 could compare ad keywords from the advertisers 102 or other information to content keywords and/or content in the content page to identify relevant ads. In some examples, the ad selections and preferences specified by the publishers 104 can be used by the AMS 106 when it selects relevant ads.

In the example shown in FIG. 1, the AMS 106 includes a backend indexing system 117 and a backend targeting system 119. These backend systems can be used in conjunction with the ad serving system 120 to facilitate the targeting of ads to parked domains. For clarity of explanation, FIG. 1 depicts a single ad serving system 120 and two separate backend systems 117 and 119. The environment 100 is not limited to such an implementation, and functionality associated with the systems 117, 119 and 120 may exist in (or be distributed among) a fewer or greater number of systems. For example, the functionality of systems 117 and 119 may exist in a single system. Alternatively, all or part of the functionality of system 117 may exist in system 119 and/or all or part of the functionality of system 119 may exist in system 117. In some implementations, all or part of the functionality of system 117 and/or system 119 can exist in the ad serving system 120.

The backend indexing system 117 may crawl or browse accessible resources (e.g., the World Wide Web, publisher content, data feeds, etc.) for information (e.g., domain pages) and store copies of the crawled information in a cache 118. The backend indexing system 117 may index crawled information or other information to build one or more indices in the cache 118. These indices may be used to facilitate rapid retrieval of information.

The cache 118 may include any mechanism or system operable to store copies of information crawled by the indexing system 117 and/or other systems. The cache 118 can store information in various manners and formats. In some examples, the cache 118 can utilize various data tables and/or directories for storing and accessing information. The cache 118 may provide a temporary storage for facilitating rapid access to information. The cache 118 may serve as a web cache, storing copies of crawled web content (e.g., domain pages). One or more components in the AMS 106 may perform or access various processes and techniques for managing the cache 118 (e.g., replacement and optimization policies) and/or for maintaining cache coherency (e.g., data integrity processes).

In some implementations, the cache 118 may store multiple versions of the same cached item. For example, over time, the cache 118 may accumulate several different versions of the same domain page. The cache 118 can be evaluated to determine which cached information should be used for ad targeting. In some examples, cached content may be used for ad targeting, whereas a cached version of a parked page may be ignored.

In some implementations, the backend indexing system 117 can generate, retrieve and/or store keywords that are used to identify relevant ads for targeting. These keywords may be generated based on information crawled by the backend indexing system 117. In some implementations, the backend system 117 can crawl accessible resources and store domain name-keyword pairs. An example can include a domain name "sports-cars-example.com" paired with a keyword "automobiles."

The backend targeting system 119 may include various statistical processes and/or modeling (e.g., regression, classification, variance, etc.) for determining languages associated with content, such as web pages stored in the cache 118. The backend targeting system 119 can, for example, use one or more statistical language classifiers to determine languages associated with content. In some implementations, the backend targeting system 119 may be configured to "guess" or infer a language of information in the cache 118, using one or more statistical (or other) processes and/or models.

The backend targeting system 119 can be used to generate and/or store keywords. In some implementations, the targeting system 119 can interact with the indexing system 117 to generate language keywords. As an example, the systems 117 and 119 can pair a keyword "German" with the domain name "sports-cars-example.com." The backend targeting system 119 can also generate and store foreign language keywords associated with content. For example, the targeting system 119 can stored German language keywords associated with automobile content. In some examples, the targeting system 119 can use various translation processes to generate foreign language keywords.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The user access devices 108 may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2A:
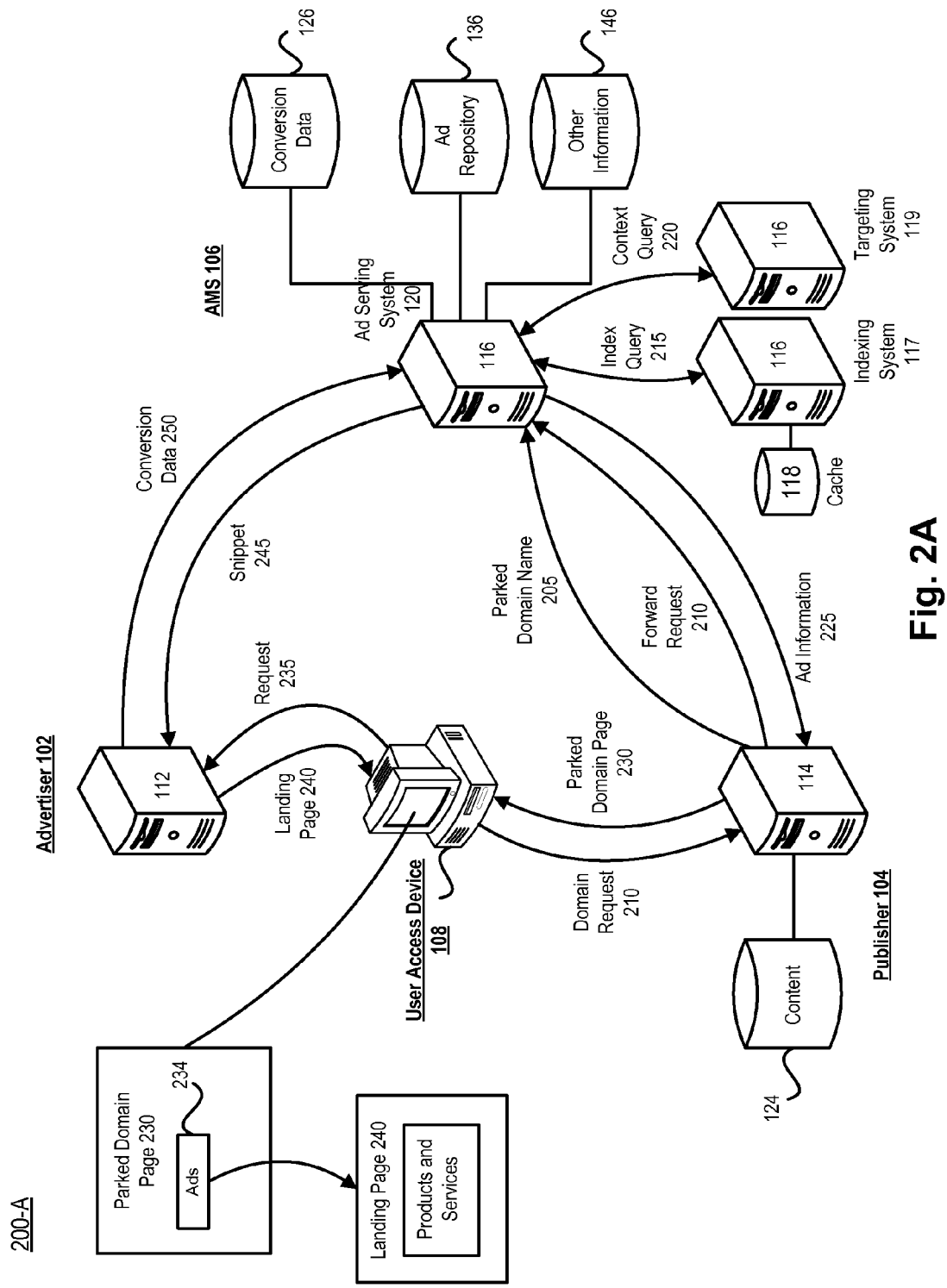

FIGS. 2A and 2B illustrate example data flows 200-A and 200-B within the environment 100. The data flows 200-A and 200-B are examples only and not intended to be restrictive. Other data flows may therefore occur in the environment 100 and, even with the data flows 200-A and 200-B, the illustrated events and their particular order in time may vary. Further, the illustrated events may overlap and/or may exist in fewer steps. Moreover, certain events may not be present and additional and/or different events may be included.

In the data flows 200-A and 200-B, the AMS 106 stores ads from the advertisers 102 for distribution to parked domains associated with a particular publisher 104. In some implementations, the publisher 104 may park one or more domains to the AMS 106 using one or more interface or front-end modules provided by the AMS 106. To park a domain, the publisher 104 may provide the AMS 106 a domain name 205 for the parked domain. The AMS 106 then uses the parked domain name 205 to target ads to the parked domain.

During the data flow 200-A in FIG. 2A, the publisher 104 may receive a domain request 210 from a particular user access device 108. The domain request 210 may, for example, include a request for a parked domain associated with publisher 104. The domain request 210 may include the parked domain name 205. In some examples, the parked domain name can be part of a URL input or selected by a user of the user access device 108. In response to the request 210, the publisher 104 may forward or redirect the domain request 210 (or information reflecting the domain request) to the AMS 106. As shown in FIG. 2A, the request 210 can be forwarded to the ad serving system 120 in the AMS 106.

In the data flow 200-A, the AMS 106 may perform one or more queries to determine a context (e.g., a language) associated with the requested domain. For example, as illustrated in FIG. 2A, the ad serving system 120 can send an index query 215 to the backend indexing system 117. The index query 215 can include information about the requested domain, such as the domain name. The AMS 106 may query the indexing system 117 to determine if there is content associated with the requested domain stored in the cache 118. For example, the AMS 106 may query the indexing system 117 to determine if content previously associated with the parked domain is stored in the cache 118.

If content is found in the cache 118, then the AMS 106 may send a context query 220 to the backend targeting system 119. The AMS 106 may send the context query 220 to determine a context, such as a language, associated with the cached domain content. The context query 220 can include, for example, all or a portion of the cached content. The context query 220 can additionally or alternatively include an identification of the cached content, which the targeting system 119 can use to access and analyze the cached content. In some examples, the context query 220 can include the domain name.

The targeting system 119 may respond to the query 220 by providing a statistically-determined "guess" about the context of the cached domain content. For example, using statistical techniques, the targeting system 119 may provide the AMS 106 an indication that the cached domain content is likely in the French language. In determining the context of the cached content, the targeting system 119 may access and analyze all or a portion of the cached content.

The queries 215 and 220 for determining a context (e.g., a language) associated with the requested domain may occur before or after the domain request 210 is received. For example, in some implementations, the queries 215 and 220 can occur in (e.g., in an offline process) upon detection of a parked domain in the system and prior to the domain request 210. When the domain request 210 is received, stored results of the queries 215 and 220 (e.g., a stored language preference and/or keywords) can be accessed and utilized for ad targeting. In other implementations, the queries 215 and 220 can occur after the domain request 210 is received. In such implementations, the domain request itself may cause the AMS 106 to detect the parked domain.

Once a context of cached content associated with the requested domain is determined, the AMS 106 may identify and retrieve ads that are relevant to the determined context, which may include a specific language. As an example, the AMS 106 may identify French language ads associated with French or non-French advertisers. The AMS 106 may also identify non-French language ads associated with French advertisers. The AMS 106 may identify and retrieve relevant ads using information from crawling modules, various keywords, various statistical associations between ads and content, and/or preference information associated with the publishers.

In some examples, the ad serving system 120 may identify relevant ads from the ad repository 136 based on information received from the indexing system 117 and targeting system 119. In some examples, the targeting system 119 may determine relevant ads (e.g., in the repository 136) and provide an indication of the relevant ads (or the ads themselves) to the ad serving system 120.

The ad serving system 120 (or another element) in the AMS 106 may provide ad information 225 to the publisher 104. The ad information 225 can include one or more ads 234. The ad information 225 can also include a signed or encoded specification of an ad. In some implementations, the ad information 225 can include markup language information, such as HTML (hypertext markup language) and/or XML (extendible markup language) data. When the publisher 104 sends a parked domain page 230 to the requesting user device 108 in response to the domain request 210, the parked domain page 230 may include the ads 234 received in the ad information 225. The publisher 104 may integrate received ads into the domain page 230 and send the domain page 230, including the ads, to the user access device 108 for display to a user. In some implementations, the ads 234 can be displayed in a graphical overlay that partially or entirely overlays a portion of the parked domain page 230, where the overlay is opaque or partially transparent.

When a user clicks on the displayed ad 234, an embedded code "snippet" may direct the user access device 108 to contact the AMS 106. A code "snippet" refers, for example, to a method used by one device (e.g., a server) to ask another device (e.g., a browser running on a client device) to perform actions after or while downloading information. At this stage of the data flow, the user access device 108 may receive an information parcel, such as a signed browser cookie, from the AMS 106. This information parcel can include information, such as an identifier of the selected ad 234, an identifier of the publisher 104, and the date/time the ad 234 was selected by the user. The information parcel may facilitate processing of conversion activities or other user transactions. Additionally or alternatively, an encoded information parcel may be included in a URL used to redirect the user access device to the advertiser 102 where the encoded information parcel may be used to track conversions.

The user access device 108 may then be redirected to the advertiser 102 associated with the selected ad 234. The user access device 108 may send a request 235 to the associated advertiser 102 and then load a landing page 240 from the advertiser 102. The user may then perform a conversion action at the landing page 240, such as purchasing a product or service, registering, joining a mailing list, etc. A code snippet 245, which may be provided by the AMS 106, may be included within a conversion confirmation page script, such as a script within a web page presented after the purchase. The user access device 108 may execute the code snippet 245, which may then contact the AMS 106 and report conversion data 250 to the AMS 106. The conversion data 250 may include conversion types and numbers as well as information from cookies. The conversion data 250 may be maintained in the conversion data repository 126.

Data flow 200-B of FIG. 2B illustrates another example data flow in the environment 100. In data flow 200-B, the publisher can receive the domain request 210. In response to the domain request 210, the publisher 104 can provide to the user access device 108 the parked domain page 230. The parked domain page 230 may include a code "snippet" 231. As noted above, a code "snippet" refers, for example, to a method used by one device to ask another device to perform actions after or while downloading information. In some examples, a code "snippet" may be implemented in JavaScript® code or may be part of HTML or other web page markup language or content.

The AMS 106 may provide the code snippet 231 to the publisher 104 and/or the user access device 108. The code snippet 231 can originate and/or be provided from other sources. As the requesting user device 108 loads the parked domain page 230, the code snippet 231 causes the user device 108 to contact the AMS 106 (or the publisher 104) and receive additional code (e.g., Java Script® or the like), which causes the parked domain page 230 to load with the ad portion 232.

The ad portion 232 may include any element that allows information to be embedded within the parked domain page 230. In some examples, the ad portion 232 may be implemented as an HTML element, such an I-Frame (inline frame) or other type of frame. The ad portion 232 may be hosted by the AMS 106 or the publisher 104 and may allow ads to be embedded inside the parked domain page 230. In some implementations, the ad portion 232 may be a graphical overlay that partially or entirely overlays a portion of the parked domain page 230, where the overlay is opaque or partially transparent. Parameters associated with the ad portion 232 (e.g., its size and shape) can be specified in the parked domain page 230 (e.g., in HTML), so that the user access device 108 can present the parked domain page 230 while the ad portion 232 is being loaded. Other implementations of ad portion 232 can also be used.

The ad portion 232 can send the AMS 106 (directly or via the publisher 104) various formatting and content information 212. This information 212 may include information describing the manner (e.g., how, when, and/or where) in which ads can be rendered by the user access devices 108. The formatting and content information 212 may also include ad attributes and parameters, such as size, shape, color, font, presentation style (e.g., audio, video, graphical, textual, etc.), etc. The information 212 may also specify a quantity of ads desired.

The formatting and content information 212 can include a domain name (e.g., in a URL) associated with the domain page 230. The formatting and content information 212 can include information associated with the content (if any) displayed in the domain page 230. This information 212 can include the domain page content itself, a category corresponding to the content or the domain request, part or all of the domain request 210, content age, content type (e.g., text, graphics, video, audio, mixed media, etc.), geo-location information, and the like.

In response to the information 212, the AMS 106 can identify ads (e.g., ads 234) that are relevant to the domain page 230. The AMS 106 may determine a context (e.g., a language) for the domain page 230 by querying the indexing and targeting systems 117 and 119, as described above in connection with queries 215 and 220 of data flow 200-A. The AMS 106 can also query other backend systems using the information 212. The AMS 106 can identify and retrieve ads that are relevant to the determined context (e.g., ads in the identified language), in a manner similar to that described above in connection with data flow 200-A.

Once relevant ads are identified, the AMS 106 may provide ad information 225 to the user access device 108 or the publisher 104. The ad information 225 can include one or more ads 234 and/or a signed or encoded specification of an ad. The ad information 225 can include markup language information, such as HTML and/or XML data. The ad information 225 can be similar to the ad information described above in connection with data flow 200-A.

The ad portion 232 in the domain page 230 may populate with ads (e.g., ads 234) included in the ad information. The ad portion 232 and the displayed ads 234 may occupy a portion of the domain page 230, which may be distinct from other content (if any) in the domain page 230. In response to a user selecting the displayed ad 234 in the ad portion 232, the user access device 108 can be redirected to the advertiser 102 associated with the selected ad 234 and can load a landing page 240 where a conversion action can be performed, as described above in connection with data flow 200-A.

The data flows 200-A and 200-B are examples only and other data flows are possible. Moreover, aspects of the data flows 200-A and 200-B may overlap or be combined. For example, data flow 200-A may include certain events from data flow 200-B. Likewise, data flow 200-B may include certain events from data flow 200-A. In addition, alternative data flows may include certain events from data flow 200-A and certain events from data flow 200-B. As an example, in certain data flows, the publisher 104 may forward domain requests (e.g., 210) to the AMS 106 and also provide an ad portion 232 in the parked domain page 230.

Figure 3:
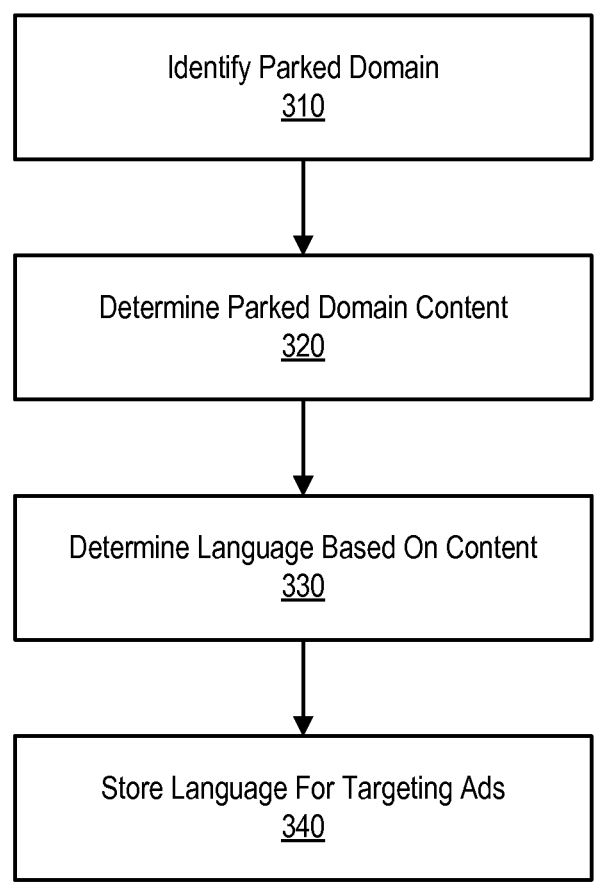
FIG. 3 is a flow diagram depicting an example advertisement targeting process.

FIG. 3 is a flow diagram illustrating an example ad targeting process 300. In some implementations, the process 300 may be performed by one or more elements in the AMS 106. The process 300 can be performed by other systems in conjunction with or instead of the AMS 106. The process 300 can identify a parked domain (310), determine parked domain content (320), determine a language based on the content (330) and store the language for targeting ads (340).

The process 300 can identify a parked domain (310). This can involve analyzing various files, logs and/or tables (in the AMS 106 or the publisher 104) to determine domains that have been parked to the AMS 106. In some examples, domains can be parked to the AMS 106 by domain registrants or holders, such as the publishers 104. Parking a domain may involve a publisher 104 logging in to the AMS 106 via an interface and inputting commands that designate a particular domain as a parked domain to which ads should be targeted.

As an example, process 310 may identify the domain "1432.com," which may be parked to the AMS 106 by a publisher 104. In this example, the domain name "1432.com" includes a generic TLD and does not include any language identifier or indication.

Allowing a publisher 104 to park a domain may involve presenting one or more interfaces through which the publisher 104 can input instructions. Presenting an "interface" may involve generating and presenting any type of physical or virtual mechanism by which a user (or system) can input information to the AMS 106 or other system and/or by which a user (or system) can perceive information generated by such systems. In some examples, presenting an interface can involve generating and presenting a graphical user interface (GUI), for example, using one or more of the front-end interfaces in the AMS 106. The interface can include various control elements, such as selection buttons, check boxes, radio buttons, toggle buttons, list boxes, pull- or drop-down lists/menus, spinners, combo boxes, check lists, select boxes, dialogue boxes, pop-ups, windows, text fields, etc. Other types of interfaces could also be used.

In some examples, identifying a parked domain (310) can include or be a part of identifying a domain for which cached content should be considered. This can involve, for example, determining whether a particular domain might be better targeted if cached content were considered in the ad targeting and/or determining how cached content should be used in the ad targeting. Various statistical and learning processes can be used for determining whether and/or how cached content should be considered for a particular domain.

Once the parked domain is identified, the process 300 can determine parked domain content (320). This can involve sending a query to one or more backend systems 117 and 119. For example, the process 300 can send a query to the indexing system 117 to determine if the cache 118 contains content associated with the parked domain (e.g., "1432.com"). Content stored in the cache can include content that is associated with a parked domain and that was crawled by the indexing system 117. If the parked domain is an expired domain, for example, the cache may include copies of content previously associated with the parked domain prior to its expiration.

Content from various network resources can be periodically (e.g., monthly, weekly, daily, hourly, etc.) searched and crawled, and the cache can store copies of this crawled content. Various crawling frequencies can be used, and different crawling operations can occur at different frequencies. In some examples, the particular frequency for a crawling operation can be fixed or adjustable and it can default to a preset value under certain conditions (e.g., at initialization or absent user input).

Determining parked domain content (320) can involve using one or more heuristics to determine whether or not to check the cache for content and/or which content in the cache to use for ad targeting. In some examples, the process 300 can determine whether it is too late to check the cache for content associated with a particular parked domain. In some examples, if the cache contains cached versions of parked domain pages, the process 300 can decide to ignore that cached content or decide not to check the cache.

The process 300 can determine a language for the parked domain based on the determined content (330). This can involve obtaining an inference or guess about the language of the cached content. In some implementations, the process 300 itself can involve performing one or more statistical techniques to generate the language inference. In some implementations, the process 300 can query one or more backend systems 117 and 119 to obtain the language inference. The process 300 can, for example, send a query to the targeting system 119 to determine a language of the cached content associated with the parked domain. The process 300 can send to the targeting system 119 the cached content itself or other information associated with the cached content.

Determining a language (330) can involve guessing or inferring a language of the cached content using one or more statistical processes. For example, a statistical classifier can be used to guess or infer the language of the cached content associated with the parked domain. For example, the statistical classifier may infer that "1432.com" is associated with Chinese content. In some examples, various statistical classification techniques can be used to infer a language, such as linear classifiers, quadratic classifiers, Bayesian networks, neural networks, Markov models, learning methods, and the like.

If no content is found in the cache (at stage 320), then determining a language (330) can include applying a default language preference, such as English. For example, if there is no cached content associated with 1432.com, then the process 300 may apply a default language preference of English. The particular default language preference can be customized depending on the particular implementation. For example, different defaults can be used for different publishers.

In some implementations, the default language preference can be determined based on the TLD of the parked domain. As an example, the "com" TLD can have a default preference of English whereas the "es" TLD can have a default preference of Spanish. The default preferences may or may not correspond to the dominant language of the country specified by the TLD. For example, the "es" TLD can have a default preference of English, even though the dominant language is Spanish. Whether or not the default preference corresponds to the dominant language may be based on the particular parked domain and various user-customizable settings.

Once a language is determined, the process 300 may store the language for targeting ads (340). This can involve pushing the language inference to one or more systems in the AMS 106. For example, the process may store in the ad targeting system 119 information indicating an association between the parked domain (e.g., "1432.com") and the inferred language (e.g., Chinese).

In some implementations, storing the language (340) can involve comparing the determined language with a dominant language of the country specified in a TLD of a domain name associated with the identified parked domain. The English language may be assumed for generic TLDs.

For example, continuing with the above example, the process 300 may compare the inferred language (e.g., Chinese) of the parked domain (e.g., "1432.com") with the English language (which can be the default for generic TLDs, such as "com"). As another example, the parked domain could be "example-domain.es" and the inferred language could be French. The process 300 may compare the determined language (French) with the Spanish language, which is the dominant language associated with the "es" TLD in the parked domain name. The process 300 can store the inferred language for targeting ads based on results of the comparison of the inferred language and the dominant language. For example, if the inferred language does not match the dominant language of the country specified by the TLD, then the process 300 can store the new language for use in targeting ads.

As an example, if the inferred language is French and the dominant language of the country associated with the parked domain name TLD is Spanish, then the process 300 may store an indication that the French language is a candidate language for the parked domain. This association with the inferred language may replace an existing (e.g., default) association with the dominant language. For example, the process 300 may replace an association between "1432.com" and the English language (e.g., the default) with information associating "1432.com" with the Chinese language.

In some implementations, the association with the inferred language can be used in addition to an association with the dominant language. For example, the domain name "example-domain.es" can be associated with Spanish (the dominant language specified by the TLD) and additionally with French (the inferred language). When targeting ads to this parked domain name, both of the language indicators can be considered when identifying relevant ads. In some examples, both French and Spanish ads can be identified as relevant. Alternatively, one of the languages can be selected as the relevant language for ads based on various other context information (e.g., geographic location of user, language settings information from a user access device, an IP address, stored user profile, etc.). Other scenarios are also possible.

Figure 4:
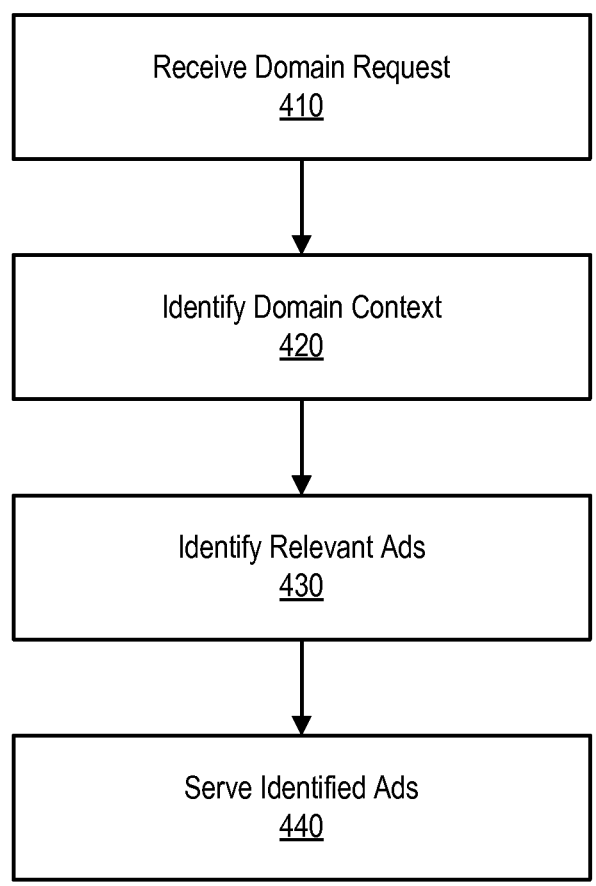
FIG. 4 is a flow diagram depicting an example advertisement serving process.

Turning now to FIG. 4, a flow diagram depicting an example advertisement serving process 400 will be discussed. The process 400 may be performed by one or more elements in the AMS 106, such as the ad serving system 120. The process 400 can be performed by other systems in conjunction with or instead of the AMS 106. The process 400 may receive a domain request (410), identify domain name context (420), identify relevant ads (430) and serve the identified ads (440).

The process 400 may begin by receiving a domain request (410). This can involve, for example, a publisher 104 receiving a content request (e.g., a search request, a request to access a domain page, etc.) from a user access device 108 and the publisher 104 providing information associated with the request (e.g., search terms, a requested URL, the content request itself, user location, user access device settings, an IP address, formatting information, ad parameters, etc.) to the ad serving system 120 in the AMS 106. Receiving a domain request may include redirecting a domain request from a publisher 104 to the AMS 106. The domain request can include a URL, which can include a domain name, associated with the parked domain.

As an example, a particular publisher 104 may receive a request from a user access device 108 for a domain page that corresponds to a parked domain. The request can include an HTTP request (or other type of communications request) routed from the user access device 108 to the publisher 104 through various intermediary network components. An example domain request can include a request method (e.g., "GET/example-page.html HTTP/1.1") and a host header (e.g., "www.example-domain.com"). The publisher 104 may redirect the user request to the AMS 106. Alternatively, requests from user access devices can be received at the AMS 106 without first passing through publishers associated with the parked domains.

The process 400 can identify domain context (420) associated with the requested domain. Identifying domain context (420) can include identifying a language preference of the user requesting the domain. Identifying domain context can involve identifying a language associated with the requested domain. The process 400 can determine, for example, that the requested domain is associated with the French language.

To identify domain context, the process 400 may perform one or more queries to various backend systems (e.g., 117 and 119) to determine a language associated with the requested domain, as described above in connection with FIG. 3. As explained above in connection with FIG. 3, a web cache (e.g., cache 118) can be used to identify content, which in turn can be used to determine a language preference. In some implementations, the process 400 can access stored information associating the requested domain with a language preference.

This information can be generated and stored in an offline process, which may in some examples occur prior to the process 400.

If no language preference can be determined, then the process 400 may apply a default language preference, such as English. This default language preference can be customized depending on the particular implementation.

Once domain context is determined, the process 400 can identify relevant ads (430) based on the determined context. This can involve searching the ad repository 136 for ads corresponding to the determined language preference. The process 400 may employ various searching and matching processes to identify relevant ads.

The language preference can be used as an ad language selection criteria and/or an ad source selection criteria. For example, if the language preference is French, then the process 400 can use the language preference to identify ads in the French language, from French advertisers or non-French advertisers. The process 400 can also use the language preference to identify ads from French advertisers, including ads in the French language or ads in another language.

In some implementations, the process 400 can identify relevant ads based on the determined context of the requested domain (e.g., language preference) as well as cached content associated with the requested domain. That is, both the cached content itself as well as the language preference inferred from the cached content can provide a basis for identifying relevant ads. The process 400 may use various matching techniques to match available ads to the cached content. In some examples, the process 400 may use the language preference to filter available ads and then use the cached content to further filter those ads passing through the language filter.

In some examples, the process 400 may use the language preference to identify a certain language, such as Chinese. The process 400 may then identify relevant ads based on the cached content by comparing content keywords to ad keywords related to the available ads. For example, if the cached content includes "automobile" related keywords, then the process 400 may match those content keywords with "automobile" related ad keywords to identify relevant ads. In some examples, the content keywords and ad keywords can include foreign-language or mixed-language keywords. The foreign language keywords can include keywords entered by advertisers and/or publishers in a particular language (e.g., a non-Roman character set) and/or keywords that have been translated by the AMS 106 from one language to another.

In some implementations, identifying relevant ads (430) can involve parsing the requested domain name to obtain a query, deriving contextual cues from the query, and selecting relevant ads based on the query and the derived contextual cues. One or more components of the AMS 106 can perform or access this functionality.

As an example of identifying relevant ads, the domain name "usedkars.com" could be requested. Parsing the domain name can include processing (e.g., segmenting and spell correcting) the domain name to obtain one or more queries. For example, the domain name "usedkars" can be segmented into {used} and {kars}. These segments can then pass through spell correcting processes, which may change the {kars} segment to {cars}.

Contextual cues can then be derived from the queries. In some examples, the ad serving system 120 can parse the domain name and send resulting queries to the ad targeting system 119, which can derive contextual cues. Deriving contextual cues can involve, for example, accessing or performing one or more semantic, clustering and/or other context-related processes. As an example, contextual cues derived from the query {cars} can include terms (e.g., {convertible}, {trucks}, etc.) identified in a cluster associated with the query {cars}. Deriving contextual cues can involve identifying, accessing and/or receiving a cluster associated with {cars} (e.g., an "automobile" cluster including the term "cars") and identifying terms in the cluster. Identifying relevant ads (430) can involve selecting one or more ads (e.g., from the ad repository 136) using one or more of the queries (e.g., {cars}) as well as one or more of the derived contextual cues (e.g., {convertible}).

In some implementations, the process 400 may identify relevant ads based on specific advertiser settings and instructions. In addition or as an alternative, relevant ads can be identified by matching available ads to geographic location, language, and other criteria. Various other ad selection and filtering techniques can also be used.

If an inferred or a default language preference is not determined, the process 400 may identify relevant ads by selecting a pre-set generic set of ads. In some examples, these generic ads can be content-agnostic in that they represent a cross-section of topics and may not be identified based on any particular content associated with a requested domain. In other examples, the generic ads could be generic with respect to language but could be related to content. The set of generic ads can be pre-set by a process in the AMS 106 and/or by a user (e.g., an administrator) of the AMS 106.

After identifying relevant ads, the process 400 may serve the identified ads (440). This may involve serving to the targeted publisher 104 or user access device 108 the ads identified in stage 430. In some examples, the ad serving system 120 in the AMS 106 may serve to the targeted publisher or user access device the identified ads.

In some implementations, serving the identified ads can involve rendering or causing the rendering of the identified ads. Ads can be rendered via various mediums and in various forms. Rendering ads can include communicating the ads through an interactive medium, such as the Internet, for display (e.g., graphical and/or audible) to a user. Ads could also be communicated through radio channels, television channels, print media, and other media.

In some implementations, the use of the cache to determine relevant ads can be evaluated to skew future targeting. For example, using a machine learning or other system included in the AMS 106, the performance of ad targeting with cached content can be analyzed. The AMS 106 can then skew future ad targeting based on the analysis. In some examples, the AMS 106 can compare the performance of ad targeting with cached content to the performance of ad targeting without cached content. The AMS 106 can identify situations in which ad targeting with cached content outperforms other ad targeting techniques. This identification can involve, for example, analyzing click-though and conversion data. The AMS 106 can intelligently and dynamically determine when to employ ad targeting with cached content based on past performance.

The illustrated sequences of events in FIGS. 3 and 4 are examples and not intended to be limiting. Other processes may therefore be used and, even with the processes depicted in FIGS. 3 and 4, the illustrated events and their particular order in time may vary. Further, the illustrated events may overlap and/or may exist in fewer steps. Moreover, certain events may not be present and additional events may be included in the illustrated processes.

The processes depicted in FIGS. 3 and 4 are not limited to "parked" domain names. For example, in some implementations, aspects of the processes 300 and 400 can be used to target ads to domains having fully developed content. In such implementations, ads can be targeted to the domains based on the domain (e.g., the domain name) instead of the domain content or based on the domain in combination with the domain content.

Example Data Processing System Configuration

Figure 5:
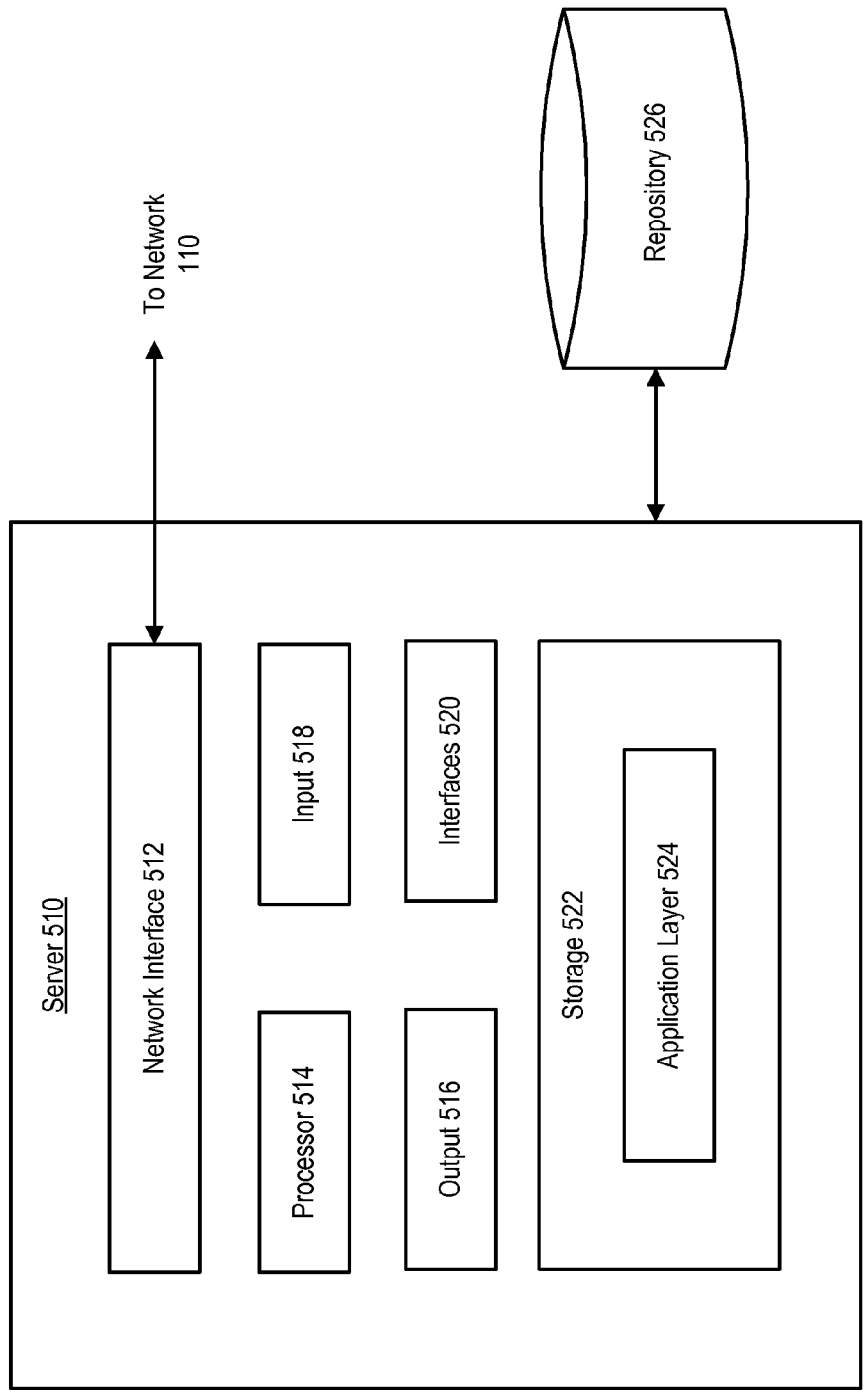
FIG. 5 is a block diagram of an example data processing system configuration.

FIG. 5 illustrates an example configuration 500 of a server system 510. In some implementations, the data processing systems 112, 114 and 116 depicted in FIG. 1 could be configured in a manner consistent with configuration 500. The configuration 500 is an example only, and the systems 112, 114 and 116 could be configured in other ways. Further, each of the servers could have its own individual structure and configuration. Moreover, as noted above, the functions provided by the systems 112, 114 and 116 could be performed by a single server computer or could be performed by a single server process running on a single computer.

In the configuration 500, the server 510 may include various components, such as a network interface 512, a processor 514, an output 516, an input 518, interfaces 520, and a storage 522. One or more system buses (not illustrated) may interconnect these components. The number, identity and arrangement of elements in the configuration 500 are not limited to what is shown, and additional and/or different elements may be contained in or coupled to the elements shown. Further, configuration 500 may include fewer components than what is illustrated.

The network interface 512 may facilitate connectivity with a network, such as the network 110. Network interface 512 may be any appropriate wireline (e.g., IEEE 1394, USB, etc.) or wireless (e.g., IEEE 802.11™, Bluetooth®, IrDA®, etc.) mechanism for facilitating unidirectional or bidirectional transmission of data between the server 510 and a network. The network interface 512 may include one or more network cards and/or data and communication ports.

The processor 514 routes information among components and executes instructions from storage 522. Although FIG. 5 illustrates a single processor, the server 510 may include any number of general- and/or special-purpose processors. The processor 514 may be implemented, for example, using one or more commercially available INTEL® processors.

The output 516 may present text, images, video, audio, or any other type of information. Examples of the output 516 include, video display devices, audio display devices, printers, and the like. The output 516 may display user interface information for various software applications running on the server 510, as well as the operating system programs necessary to operate the system. The output 516 may present information by way of a cathode ray tube, liquid crystal, liquid crystal on silicon, light-emitting diode, gas plasma, laser, or other type of display mechanism. The output 516 could also be configured to receive, generate and/or present holographic or other visual representations. The output 516 may be configured to audibly present information, and it may include suitable components for receiving and presenting audio signals. Although FIG. 5 illustrates a single output 516, the server 510 may include any number of similar or different output devices.

The input 518 may include components such as a keyboard, a mouse, a pointing device, a joystick, and/or a touch screen. The input 518 may also include audio- or video-capture devices (e.g., video cameras, microphones, etc.) and/or various sensors for sensing emissions (e.g., thermal, motion, sound, etc.). It may also include one or more information reading devices (e.g., scanners, disk drives, etc.) and/or input ports. Although FIG. 5 depicts the input 518 as a single discrete element, the server 510 may include any number of similar or different input devices. For example, the server 510 could include a keyboard and a mouse as well as a video-capture device, a scanner and several disk drives.

A user of the server 510 may input commands to control and operate functionality of the server 510 by way of the output 516 and the input 518. These commands may, for example, be input by way of user manipulation of physical controls, such as a keyboard or mouse. The user may input commands to select and manipulate graphics and text objects presented on the output 516 in order to operate and control the server 510.

The interfaces 520 may include various interfaces for facilitating bidirectional or unidirectional communication between the server 510 and one or more peripheral or other devices. The peripheral devices may include, for example, output devices (e.g., a monitor, a printer, a speaker, etc.), input devices (e.g., a keyboard, a mouse, a scanner, etc.), or any other device operable to connect to the server 510. The interfaces 520 may include a combination of hardware, software and/or firmware components. The interfaces 520 may include various connection ports, such as USB, RS-232, RS-485, Fibre Channel, Ethernet, IEEE 1394, RG-6, and/or TOSLINK®.

The storage 522 may provide mass storage and/or cache memory for the server 510. The storage 522 may be implemented using a variety of suitable memory elements. The memory elements may include, for example, solid state elements, optical elements, polymer elements, magnetic elements, and/or organic elements (e.g., crystals). The memory elements may be volatile or non-volatile and may be randomly or sequentially accessed. The storage 522 may include random access memory (RAM), flash RAM, read-only memory (ROM), erasable programmable read-only memory (EPROM), and electrically erasable programmable read-only memory (EEPROM). The storage 522 may include one or more fixed disk drives (e.g., a hard drive, RAID storage, etc.) and one or more removable disk drives (e.g., a CD-ROM drive, DVD drive, etc.). Although a single storage module is shown, the server 510 may include any number of individually configured storage modules.

The storage 522 may store program code for various applications, an operating system (e.g., Windows® XP, Linux® OS), an application-programming interface, application routines, middleware components, and/or other executable instructions. The storage 522 may include program code and information for communications (e.g., TCP/IP communications), middleware components, kernel and device drivers, invariant low-level systems code, data for basic input and output, and various configuration information.

The storage 522 may maintain an application layer 524, which may include various software programs and modules. Such programs and modules could be transferred to a hard drive (not shown) in the storage 522 by way of network transmissions (e.g., an Internet download) and/or removable disks (also not shown), such as a CD-ROM or DVD.

In the configuration 500, the server 510 may be coupled to one or more repositories 526. In some examples, the repositories 124, 126, 136 and 146 may be implemented in a manner consistent with the repositories 526. The repository 526 may include any structured collection or aggregation of information that is stored and accessible. In some implementations, the repositories 526 may include one or more structured data archives distributed among one or more network-based data processing systems. The repositories 526 may include one or more schemas for organizing stored information. In some examples, the repositories 526 may include one or more relational databases and systems, distributed databases, object-oriented databases, and/or any other types of databases. Examples of databases include Oracle® databases, IBM DB2®, systems, MySQL® databases, XML databases, and the like. Although illustrated as coupled to the server 510, the repositories 526 could be distributed and/or included in various systems and/or networks.

Example Application Layer Configuration

Figure 6:
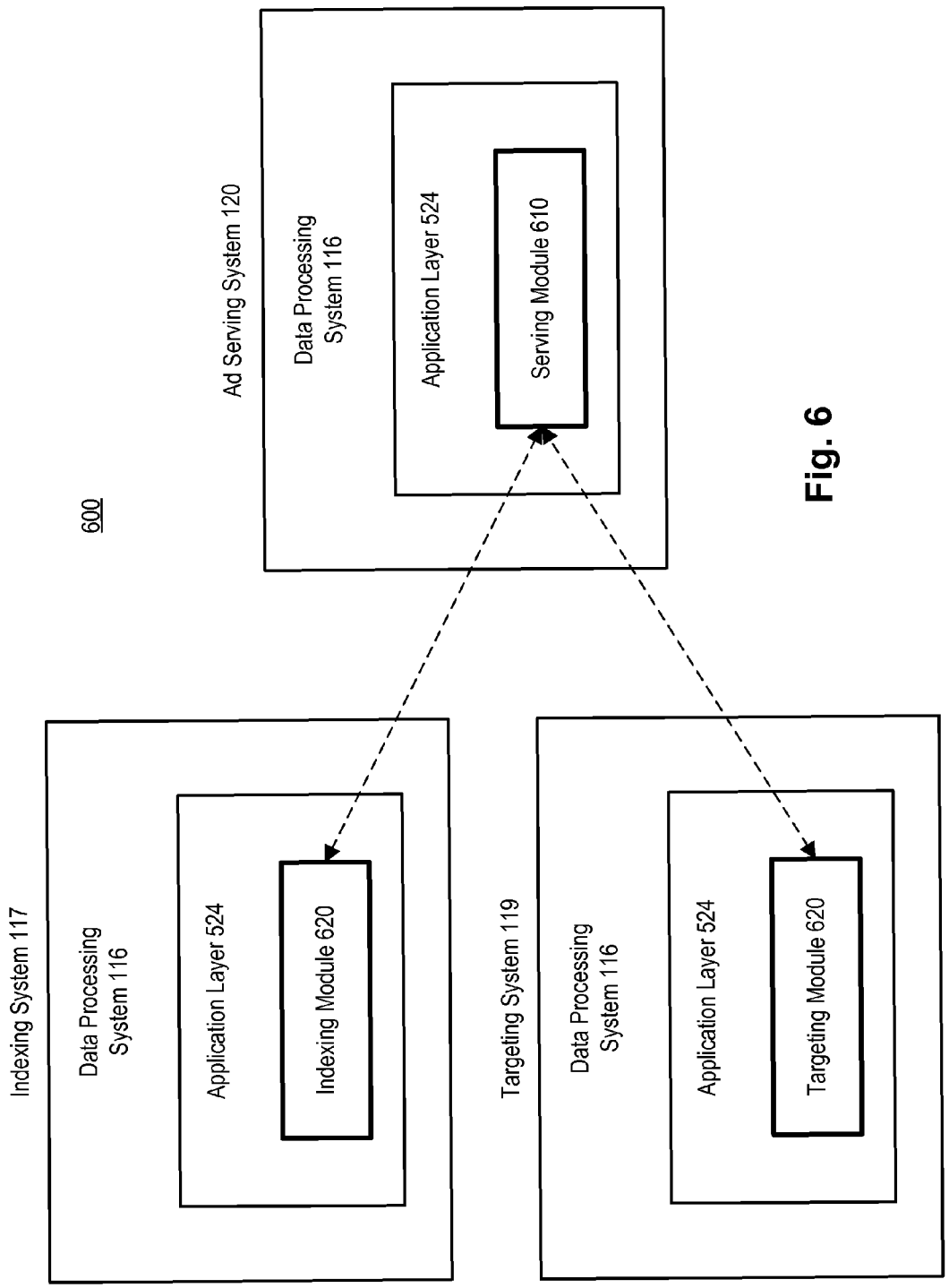
FIG. 6 is a block diagram of an example application layer configuration.

FIG. 6 is a block diagram of an example application layer configuration 600, which may be maintained in the AMS 106. The configuration 600 may represent the configuration of one or more application layers 524 of one or more data processing systems 116 maintained by the AMS 106. As illustrated in FIG. 6, the application layer configuration 600 may include an ad serving module 610, an indexing module 620, and a targeting module 630. As illustrated, the indexing and targeting modules 620 and 630 can be located in separate backend systems and the serving module 610 can be located in the ad serving system 120. The ad serving module 610 can interact with the indexing module 620 and/or the targeting module 630 (and/or other modules not shown). Likewise, the indexing module 620 and the targeting module 630 can interact with each other and other modules.

The particular arrangement illustrated in FIG. 6 is an example only, and other arrangements are possible. For example, the indexing and targeting modules 620 and 630 can be co-located in a single data processing system 116 while the serving module 610 can be located in a different data processing system. As another example, the modules 610, 620 and 630 can all be co-located in a single data processing system 116. In some examples, the various functionality of the modules 610, 620 and 630 can be distributed or exist in more or less modules that what is illustrated in FIG. 6.

The modules 610, 620 and 630 may include and/or use one or more data structures as well as one or more computational algorithms that may operate on various data. The modules may include sets of instructions for performing various tasks, and the modules may output information for use by users or other systems. In some implementations, the modules may include one or more engines, which may output code (e.g., source code, HTML, etc.) that serves as input to other systems, engines or processes.

The modules 610, 620 and 630 may be implemented using any programming or other language suitable for controlling behavior of a system, such as a computer. In some examples, the modules 610, 620 and 630 may be implemented using one or more of C/C++, Java, Visual Basic, eXtendible Markup Language (XML), HTML and other languages.

Although depicted within software application layers 524, the modules 610, 620 and 630 could include and/or be coupled to various hardware elements (within or external to the data processing system(s)). For example, the modules could include one or more neural networks, which may employ software and hardware processing elements or agents linked together. In some examples, the modules could include or use one more embedded systems, such as microcontrollers, routers, etc.

The ad serving module 610 may be configured to provide various functionality associated with providing ads from the AMS 106 to parked domains. In some implementations, the module 610 may provide features associated with AdWords™ and/or AdSense™ provided by Google, Inc. In some implementations, the module 610 (independently or in conjunction with other systems and modules) may perform aspects of the process 300 and/or the process 400. The ad serving module 610 can be configured with executable instructions that perform aspects of the process.

The indexing and targeting modules 620 and 630 can be configured to provide various backend functionality for the AMS 106. For example, the indexing module 620 can be configured to crawl available resources and store copies of crawled content in a cache, such as the cache 118. The targeting module 630 can be configured, for example, to perform various statistical processes, such as processes for inferring language preferences associated with parked domains.

In some implementations, the indexing module 620 and/or the targeting module 630 (independently or in conjunction with other systems and modules) may perform aspects of the process 300 and/or the process 400. Each of the modules 620 and 630 may be configured with executable instructions that perform aspects of the processes.

Example User Access Device Configuration

Figure 7:
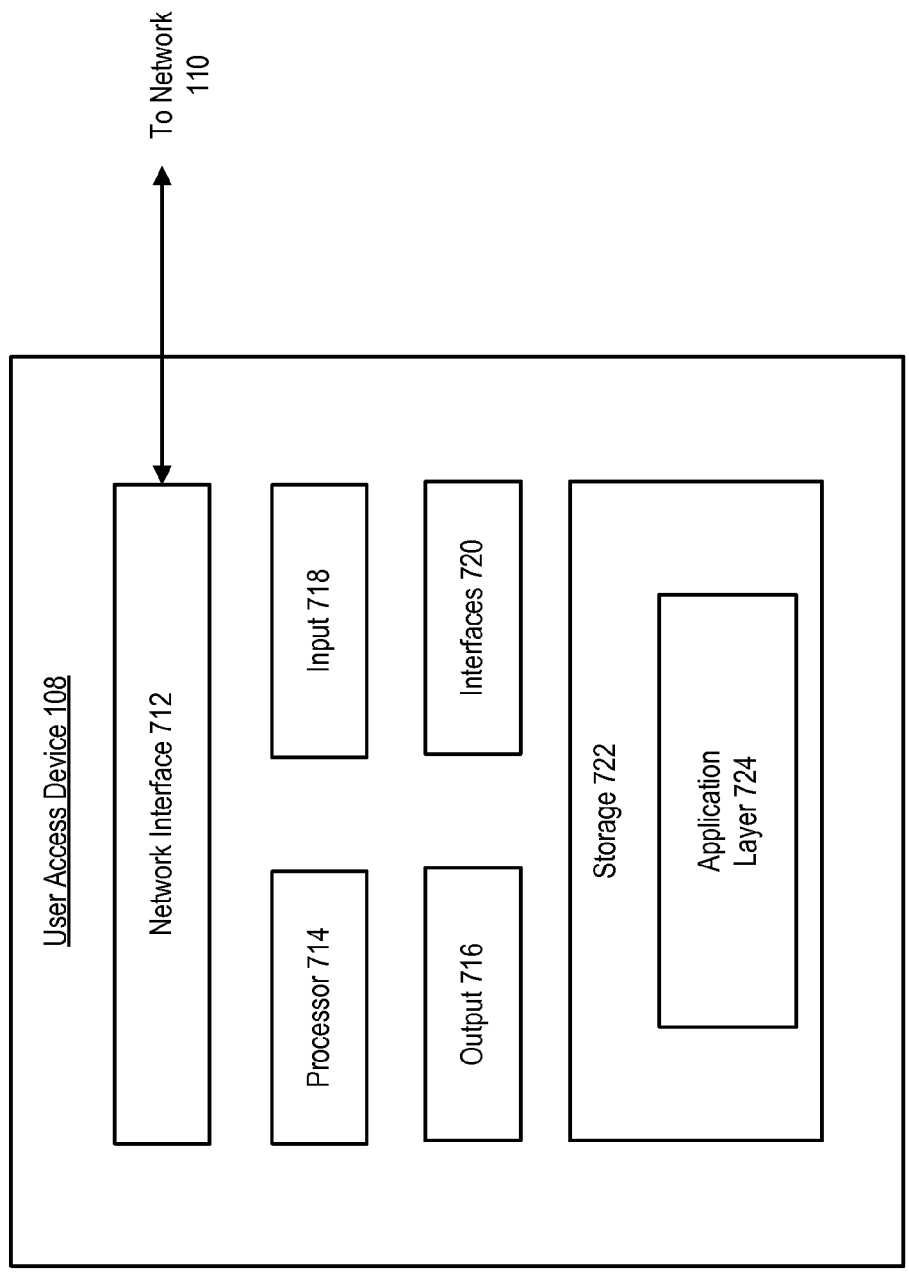
FIG. 7 is a block diagram of an example user access device configuration.

FIG. 7 is a block diagram of an example configuration 700 of the user access devices 108 in environment 100. The number, identity and arrangement of elements in the configuration 700 are not limited to what is shown, and additional and/or different elements may be contained in or coupled to the elements shown. The configuration 700 is an example only, and the user access device 108 could be configured in other ways.

In the example configuration 700, the user access devices 108 may include various components, such as a network interface 712, a processor 714, an output 716, an input 718, interfaces 720, and a storage 722, which may maintain an application layer 724. The components illustrated in FIG. 7 (i.e., 712, 714, 716, 718, 720, 722, and 724) may be similar in structure and functionality to those components described in connection with FIG. 5 (i.e., 512, 514, 516, 518, 520, 522, and 524). In some implementations, however, one or more of the user access devices 108 may include components that are structurally and functionally different from those described in connection with FIG. 5. For example, the user access devices 108 may be configured with different (e.g., less) storage capacity and different application layers than the server system. In some examples, the application layer 724 in a user access device may include one or more modules configured to present various viewers (e.g., browsers) to users. The application layer 724 may also include one or more modules for interacting with other elements (e.g., data processing systems 112, 114 and/or 116), receiving and processing ads, and/or presentation ads to users.

The user access devices 108 could also be configured with less or different processing capabilities than that of the server system. In some examples, the user access devices 108 may include various user interface components (e.g., keypads, display devices, speakers, microphones, etc.) while the server system may lack such (or even any) user interface components. In some examples, the server system 510 could be a general purpose server while the user access devices 108 could include embedded systems optimized with specific components for performing specific tasks.

Implementations and techniques discussed above may include a method or process, a system or apparatus, or computer software on a computer-accessible medium.

The foregoing description does not represent an exhaustive list of all possible implementations consistent with this disclosure or of all possible variations of the implementations described. Other implementations are within the scope of the following claims.

What is claimed is:

1. A method performed by a computer system that comprises one or more processors and memory, comprising:
    detecting information specifying a domain name for one or more resources;
    searching a cache for cached content that is associated with the domain name for the one or more resources, with the cached content differing from the information specifying the domain name, and with the cache storing copies of content in the one or more resources obtained through periodic crawling of a network for the content in the one or more resources;
    retrieving, from the cache, the cached content associated with the domain name;
    determining a type of language used in the retrieved cached content that is associated with the domain name; and
    selecting, at least partly based on the determined type of language, an advertisement item for display in at least one of the one or more resources associated with the domain name.

2. The method of claim 1, wherein the domain name comprises a parked domain name.

3. The method of claim 1, wherein the domain name comprises a language-independent domain.

4. The method of claim 3, wherein the language-independent domain comprises at least one of a .com identifier, a .net identifier or an .org identifier.

5. The method of claim 1, further comprising:
    periodically crawling the network for the content in the one or more resources; and
    storing the copies of the content in the cache.

6. The method of claim 1, wherein determining the type of language comprises determining a type of spoken language, and wherein the advertisement item is in the type of spoken language.

7. The method of claim 1, wherein selecting the advertisement item comprises:
    parsing the domain name to obtain a query;
    deriving contextual cues from the query; and
    selecting the advertisement item using the query, the derived contextual cues, and the determined type of language.

8. The method of claim 1, wherein the cache comprises a web cache.

9. The method of claim 1, further comprising:
    delivering the advertisement item to a computing device that sent a request for at least one of the one or more resources.

10. The method of claim 1, further comprising:
    parsing the domain name to obtain a query; and
    selecting the advertisement item using the query and the determined type of language.

11. A non-transitory computer-readable hardware storage device storing instructions that are executable by at least one processor to perform operations comprising:
    detecting information specifying a domain name for one or more resources;
    searching a cache for cached content that is associated with the domain name for the one or more resources, with the cached content differing from the information specifying the domain name, and with the cache storing copies of content in the one or more resources obtained through periodic crawling of a network for the content in the one or more resources;
    retrieving, from the cache, the cached content associated with the domain name;
    determining a type of language used in the retrieved cached content that is associated with the domain name; and
    selecting, at least partly based on the determined type of language, an advertisement item for display in at least one of the one or more resources associated with the domain name.

12. The non-transitory computer-readable hardware storage device of claim 11, wherein the domain name comprises a parked domain name.

13. The non-transitory computer-readable hardware storage device of claim 11, wherein the domain name comprises a language-independent domain.

14. The non-transitory computer-readable hardware storage device of claim 11, wherein the operations further comprise:
    periodically crawling the network for the content in the one or more resources; and
    storing the copies of the content in the cache.

15. The non-transitory computer-readable hardware storage device of claim 11, wherein the operations further comprise:
    parsing the domain name to obtain a query;
    deriving contextual cues from the query; and
    selecting the advertisement item using the query, the derived contextual cues, and the determined type of language.

16. The non-transitory computer-readable hardware storage device of claim 11, wherein the operations further comprise:
    delivering the advertisement item to a computing device that sent a request for at least one of the one or more resources.

17. A system comprising:
    at least one processor; and
    a computer-readable hardware storage device storing instructions that are executable by the at least one processor to perform operations comprising:
        detecting information specifying a domain name for one or more resources;
        searching a cache for cached content that is associated with the domain name for the one or more resources, with the cached content differing from the information specifying the domain name, and with the cache storing copies of content in the one or more resources obtained through periodic crawling of a network for the content in the one or more resources;
        retrieving, from the cache, the cached content associated with the domain name;
        determining a type of language used in the retrieved cached content that is associated with the domain name; and
        selecting, at least partly based on the determined type of language, an advertisement item for display in at least one of the one or more resources associated with the domain name.

18. The system of claim 17, wherein the domain name comprises a parked domain name.

19. The system of claim 17, wherein the domain name comprises a language-independent domain.

20. The system of claim 17, wherein the operations further comprise:
    periodically crawling the network for the content in the one or more resources; and
    storing the copies of the content in the cache.

21. The system of claim 17, wherein the operations further comprise:
    parsing the domain name to obtain a query;

deriving contextual cues from the query; and selecting the advertisement item using the query, the derived contextual cues, and the determined type of language.

22. The system of claim 17, wherein the operations further comprise:

delivering the advertisement item to a computing device that sent a request for at least one of the one or more resources.

23. A system comprising:

means for detecting information specifying a domain name for one or more resources;

means for searching a cache for cached content that is associated with the domain name for the one or more resources, with the cached content differing from the information specifying the domain name, and with the cache storing copies of content in the one or more resources obtained through periodic crawling of a network for the content in the one or more resources;

means for retrieving, from the cache, the cached content associated with the domain name;

means for determining a type of language used in the retrieved cached content that is associated with the domain name; and means for selecting, at least partly based on the determined type of language, an advertisement item for display in at least one of the one or more resources associated with the domain name.

24. A method performed by a computer system that comprises one or more processors and memory, comprising:

detecting information specifying a domain name for one or more resources;

parsing the domain name to obtain a query;

deriving contextual cues from the query;

searching a data repository for content that is associated with the domain name for the one or more resources;

retrieving, from the data repository, the content associated with the domain name;

determining a type of language used in the retrieved content that is associated with the domain name; and selecting, at least partly based on the query, the derived contextual cues and the determined type of language, an advertisement item for display in at least one of the one or more resources associated with the domain name.

* * * * *